MAGNETIC REPRODUCE SYSTEM AND METHOD

Filed April 3, 1961 2 Sheets-Sheet 1

ALBERT BAABA & DONALD F. ELDRIDGE
INVENTORS
BY Nathan N. Kallman
ATTORNEY

ALBERT BAABA &
DONALD F. ELDRIDGE
INVENTORS
BY Nathan N. Kallman
ATTORNEY

United States Patent Office 3,229,273

Patented Jan. 11, 1966

3,229,273

MAGNETIC REPRODUCE SYSTEM AND METHOD

Albert Baaba, San Mateo, and Donald F. Eldridge, Palo Alto, Calif., assignors to Ampex Corporation, Redwood City, Calif., a corporation of California Filed Apr. 3, 1961, Ser. No. 100,079
9 Claims. (Cl. 340—174.1)

The present invention relates to magnetic tape apparatus and particularly to an improved means for reproducing information recorded on magnetic tape.

Normally, in magnetic tape apparatus, a magnetic tape is moved longitudinally between a tape supply reel and a tape take-up reel. During recording or reproducing, the tape is transferred from the supply reel to the take-up reel by a capstan which, in cooperation with a pressure roller, applies traction to the tape.

In previously available magnetic tape apparatus, an electrical signal to be recorded is applied to a magnetic recording head disposed along the path of movement of the tape between the supply reel and the take-up reel. A magnetic field is established at the gap of the recording head which field magnetizes the magnetic tape as it is pulled past and in initimate contact with the head, the information being recorded on the magnetic tape as a magnetic pattern. The information is reproduced by employing a magnetic reproducing head to sense the magnetic field established by the pattern as the tape is pulled past and in intimate contact with the reproducing head.

As the tape is pulled past the recording and reproducing heads, oxide on the magnetic tape acts as an exceedingly fine abrasive which at first polishes the heads and then wears them down. Hence, the operating life of a recording or reproducing head is relatively short. The scraping of the tape along each of the heads also causes longitudinal vibration of the tape thereby increasing flutter (i.e., a frequency modulation of the reproduced information).

The maximum frequency that can be effectively reproduced from a magnetic tape by previously available apparatus has been limited primarily by the inductance of the reproduce head, and the minimum wavelength has been limited primarily by the width of the nonmagnetic gap in the reproduce head. In this connection, as the frequency of signal being reproduced approaches that value at which the wavelength equals the gap width, the voltage output from the reproducing head falls off rapidly. If the gap width is decreased to improve the high frequency response of the reproducing head, the voltage output of the head is less for all frequencies. With the conventional reproduce head that is sensitive to the rate of change of flux from the tape, losses in output signal at long wavelengths and at reduced speeds are experienced. Furthermore, such a head is also sensitive to crosstalk from adjacent channels.

In accordance with the present invention an improved means is provided for producing information recorded as a magnetic pattern on magnetic tape. In this reproducing means, a thin film of ferromagnetic material carried by a supporting member is exposed to the magnetic field established by the magnetic pattern. The film is thereby magnetized with a magnetic field pattern corresponding to that on the tape. A plane polarized light beam is directed at the magnetized film so that the polarized light beam is affected by the magnetic pattern. Means are provided for determining the rotation of the polarized light beam affected by the film and thereby the amplitude and direction of the magnetization on the tape. By proper selection of film properties and light beam angles, polar, longitudinal or lateral fields, or a combination thereof may be detected.

An object of the present invention is the provision of an improved means for reproducing information recorded on a magnetic tape.

Another object is the provision of a means for reproducing information recorded on a magnetic tape at a relatively high rate and with relatively high accuracy.

Still another object is the provision of a magneto-optic means for reproducing information recorded on a magnetic tape which is durable in operation and relatively inexpensive to manufacture and maintain.

A further object is the provision of means for high speed scanning of the tape without the attendant difficulties normally encountered as a result of mechanical contact between high speed rotating heads and tape.

Other objects and advantages of the present invention will become apparent by reference to the following description and accompanying drawings in which.

Figures 1, 2, 3, 7:
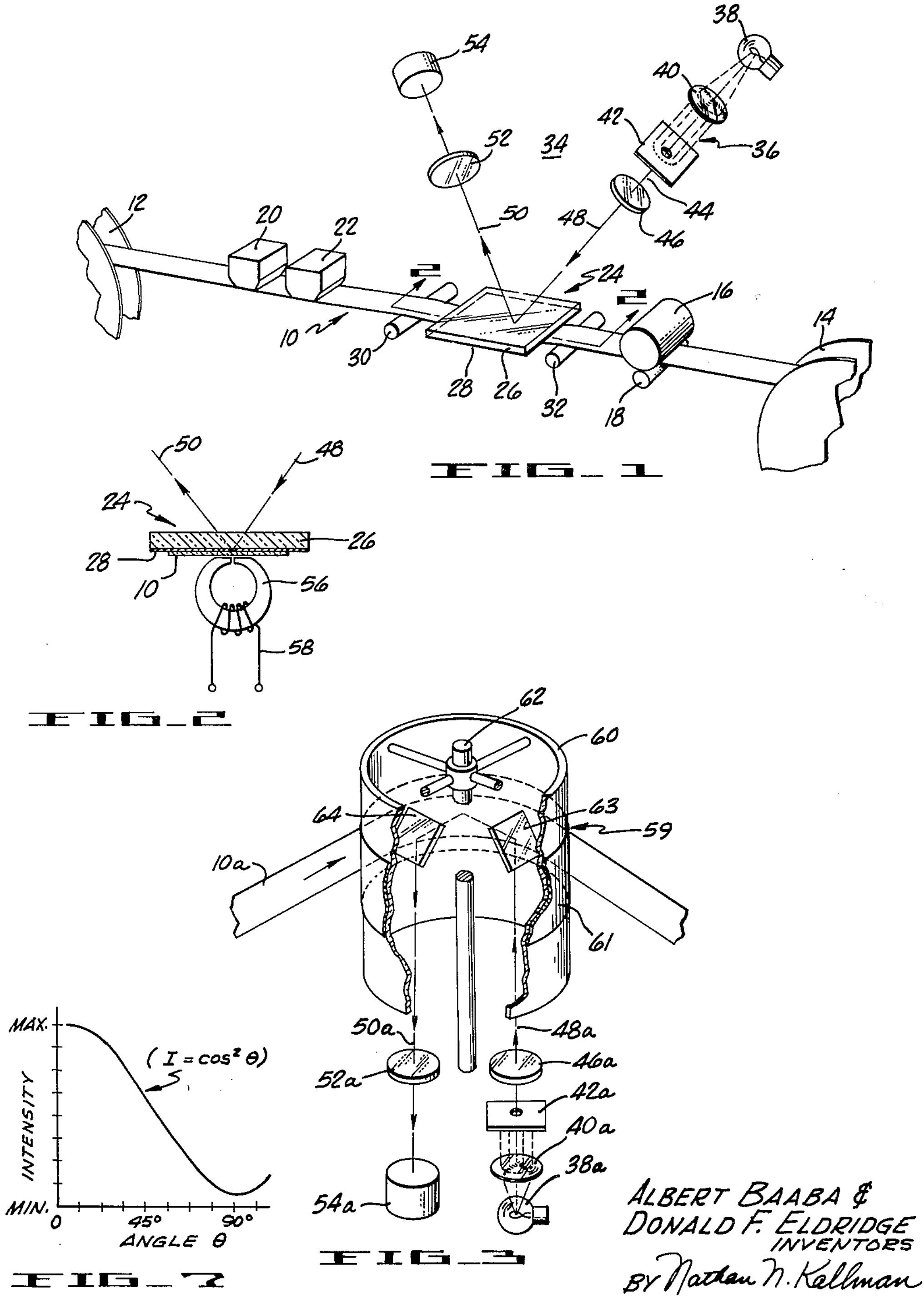
FIGURE 1 is a schematic perspective view of a magnetic tape apparatus which incorporates one embodiment of a reproducing means constructed in accordance with the present invention, which reproducing means includes a magneto-optic means for reading out the back surface of a magnetic film in contact with the magnetic tape.
FIGURE 2 is an enlarged cross-sectional view taken generally along line 2—2 of FIGURE 1.
FIGURE 3 is a schematic perspective view of another embodiment of the reproducing means in accordance with the present invention, portions being broken away to show the internal construction thereof, which reproducing means includes magneto-optic means for reading out the back surface of a magnetic film in contact with the magnetic tape.
FIGURE 7 is a characteristic curve that is useful in the explanation of the invention.

As shown in FIGURE 1, a magnetic tape 10 is extended between a conventional tape supply reel 12 and a conventional tape take-up reel 14 (both partially shown). Suitable guides (not shown) are provided for guiding the tape between the reels. During recording or reproducing the tape 10 is continuously moved in the direction of its longitudinal axis from the supply reel 12 to the take-up reel 14 by a capstan 16 and a coacting pressure roller 18.

Disposed between the supply reel 12 and the capstan 16 in the path of movement of the tape are an erase head 20 and a recording head 22. During recording, an electrical signal is applied to the recording head 22 thereby inducing a magnetic pattern on the tape corresponding to the electrical signal.

In the embodiment illustrated in FIGURE 1, the information recorded on the tape is reproduced by a reproducing means 24 which is disposed between the record head 22 and the capstan 16. The reproducing means 24 includes a thin flat or convex rectangular plate or supporting member 26 of transparent material such as glass, quartz, etc. The plate 26 is suitably supported so that the plane of the plate 26 extends generally parallel to that of the tape 10.

A thin film 28 of ferromagnetic material is suitably deposited on the surface of the plate 26 which is faced toward the tape 10. The tape 10 is maintained in intimate contact with the film 28 by a pair of pressure fingers 30 and 32, which fingers are disposed respectively before and after the plate 26. As the tape is pulled past the thin film 28, the magnetic field established by the magnetic pattern on the tape 10 magnetizes the film 28 with a corresponding pattern. An additional thin protective coating may be placed over the ferromagnetic material to prevent abrasion, oxidation or accidental damage.

The film 28 is composed of a ferromagnetic material which, preferably, for best reproduction has a coercive force low enough so that it is readily magnetized by relatively weak fields from the tape. Since presently available magnetic tape has a coercive force between 250 and 300 oersteds, the film is preferably made of material which has a much lower coercive force than 250 oersteds, such as cobalt, Permalloy (68% nickel and 32% iron), etc.

The magnetic pattern on the film is read out by a magneto-optic means 34. The magneto-optic readout means 34 includes a means 36 for providing a plane polarized light beam which, in the illustrated embodiment, comprises an incandescent light bulb 38, a lens 40 for focusing the light beam from the light bulb 38 into a parallel beam, and an apertured plate 42 for providing a narrow light beam 44.

The resulting light beam is directed through a polarizer 46, such as a Nicol prism, a Glan-Thompson prism, a Polaroid sheet, etc., which provides a plane polarized light beam 48 at its output, that is, a light beam in which the electric vectors of all components of the light beam lie in the same fixed plane.

The polarized light beam 48 is directed through the transparent supporting member 26 toward the inner surface of the magnetic film 28 and is reflected thereby. To provide a good reflecting surface, the surface of the supporting member 26 is highly polished before the film 28 is deposited thereon. The reflected light beam 50 is passed through an analyzer 52, which may be a Nicol prism, a Polaroid sheet, etc., to a light detector 54, such as a photo-cell, phototube, etc.

The plane of polarization of the reflected light beam 50 is rotated to a degree in accordance with the magnetic pattern registered on the film 28 (magneto-optic Kerr effect), the direction and amount of rotation depending upon the magneto-optic properties of the film and the state of magnetization that is determined by the tape field. The intensity of light transmitted through the analyzer 52 is dependent upon the angle of the reflected light wave (FIGURE 7). As the state of magnetization of the film is changed by the tape fields, the angle of rotation of the reflected light wave changes, thereby changing the intensity of light transmitted to the detector 54. Thus, the analyzer 52 and the detector 54 serve as a means for detecting the rotation of the light beam.

An alternating current or direct current biasing magnetic field may be applied to the film 28 to improve the linearity or change the sensitivity of the film 28. The biasing field may be provided by a pole piece 56, as illustrated in FIGURE 2, having a coil 58 wrapped therearound, which is disposed adjacent the tape 10. By biasing the film with a steady-state or direct current magnetic field having a strength which is less than the coercive force of the film, the sensitivity of the film to variation in the strength of the tape's magnetic field is increased. For example, if the coercive force of the film is 10 oersteds, and if the film is in the negative saturated state, a field from the tape of about 10 oersteds will be required to flip the film to the positive saturated state. If a positive D.C. bias field of 9 oersteds is applied, however, an additional field of only 1 oersted will be required to flip it to a saturated state of opposite polarity. Thus, the film has become more sensitive to fields from the tape. When an A.C. bias field is applied, the process is similar to that which occurs in A.C. bias magnetic recording systems, i.e., the magnetization of the film occurs as the portion of the film moves out of the bias field or as the bias field is reduced toward zero. An increase in sensitvity occurs with A.C. bias, and the film may be in any magnetic state before it enters the bias field. The peak amplitude of the A.C. bias field will be somewhat larger than the coercive force of the film.

In one embodiment of the reproducing means, a substrate or supporting member of glass is highly polished on one surface and this surface is plated with a 1000-angstrom thick film of cobalt. A parallel beam of plane polarized light approximately .0005 square inch in cross section is directed at an angle of approximately 45 degrees to the normal of the inner surface of the film. Glan-Thompson prisms are employed as the analyzed and polarizer, and the rotation of the polarized light is sensed by a photo-cell.

The above described reproducing means reproduces information with very high accuracy. Especially good results are obtained with return-to-zero (RZ) digital recording wherein the recorded information is represented on the tape by the presence or absence of magnetization, and with non-return-to-zero (NRZ) digital recording wherein the recorded information is represented on the tape by the polarity or direction of the magnetization. Both types of digital recording require only the detection of two possible states of magnetization of the film. The requirements for detection of information stored in analog form are somewhat different. The film must be able to produce a smooth and gradual change of output from the detector, and therefore the magnetization of the film must assume a great number of states.

In the embodiment of the reproducing means, shown in FIGURE 3, wherein similar parts to those shown in FIGURE 1 are indicated with the same reference numeral with the subscript "*a*," the reproducing means includes a rotatably mounted drum 59, the tape **10*a* being wrapped about a portion of the circumference thereof. The drum 59 includes a tubular supporting member 60 of a transparent material, such as glass, quartz, etc., which is provided with a highly polished external and internal surface. A thin film 61 of low coercive force, ferromagnetic material is deposited on the external surface of the tubular member 26*a*** so as to form an unbroken circumferential band.

The tubular member 60 is suitably journalled on an axially extending shaft 62 which is fixedly disposed in the recording apparatus. The moving tape **10*a* is wrapped partially around the circumferential film 61 on the tubular member 60, the tape thereby rotating the drum 59. The magnetic pattern on the tape 10*a* is transferred to the film 61** by the contact therebetween.

The drum 59, as well as the drums in the reproducing means described hereinafter, may be employed as the capstan in the magnetic tape apparatus by positively driving the drum 59 and providing a pressure roller to press the tape against the drum 59. In this way, irregularities in tape pay-off and tape take-up are less likely to affect the reproduced information.

The transferred magnetic pattern on the film 61 is read out by a similar magneto-optic reproducing means to that described previously in connection with FIGURE 1. In FIGURE 3, the plane polarized light beam **48*a* is directed through the tubular member 60** generally parallel to the axis thereof.

A reflecting means or mirror 63, which is suitably supported within the tubular member by the shaft 62, is arranged to reflect the polarized light beam **48*a* through the transparent tubular member 60 toward the inner surface of the film 61**.

The polarized light beam 48$a$ is reflected by the film 61 and a second reflecting means or mirror 64, which is suitably supported within the tubular member by the shaft 62, is arranged to direct the reflected polarized light beam 50$a$ through the tubular member 60 generally parallel to the axis thereof. The reflected polarized light beam 50$a$ is passed through the analyzer 52$a$ to the detector 54$a$. Care must be exercised so that ellipticity is not introduced by reflection from any of the surfaces because the light wave is not parallel or perpendicular to the plane of incidence.

Since the drum 59 and the tape are moving at the same linear speed, there is no sliding friction between the drum 59 and the tape. Thus, variable tape stretch is minimized and hence flutter is reduced.

In one embodiment of the transparent drum type reproducing means, the supporting member may be made of Pyrex which is .25 inch thick. One surface of the supporting member is highly polished and a 400-A. thick circumferential film of cobalt is deposited thereon, by way of example.

Figures 4, 5, 6:
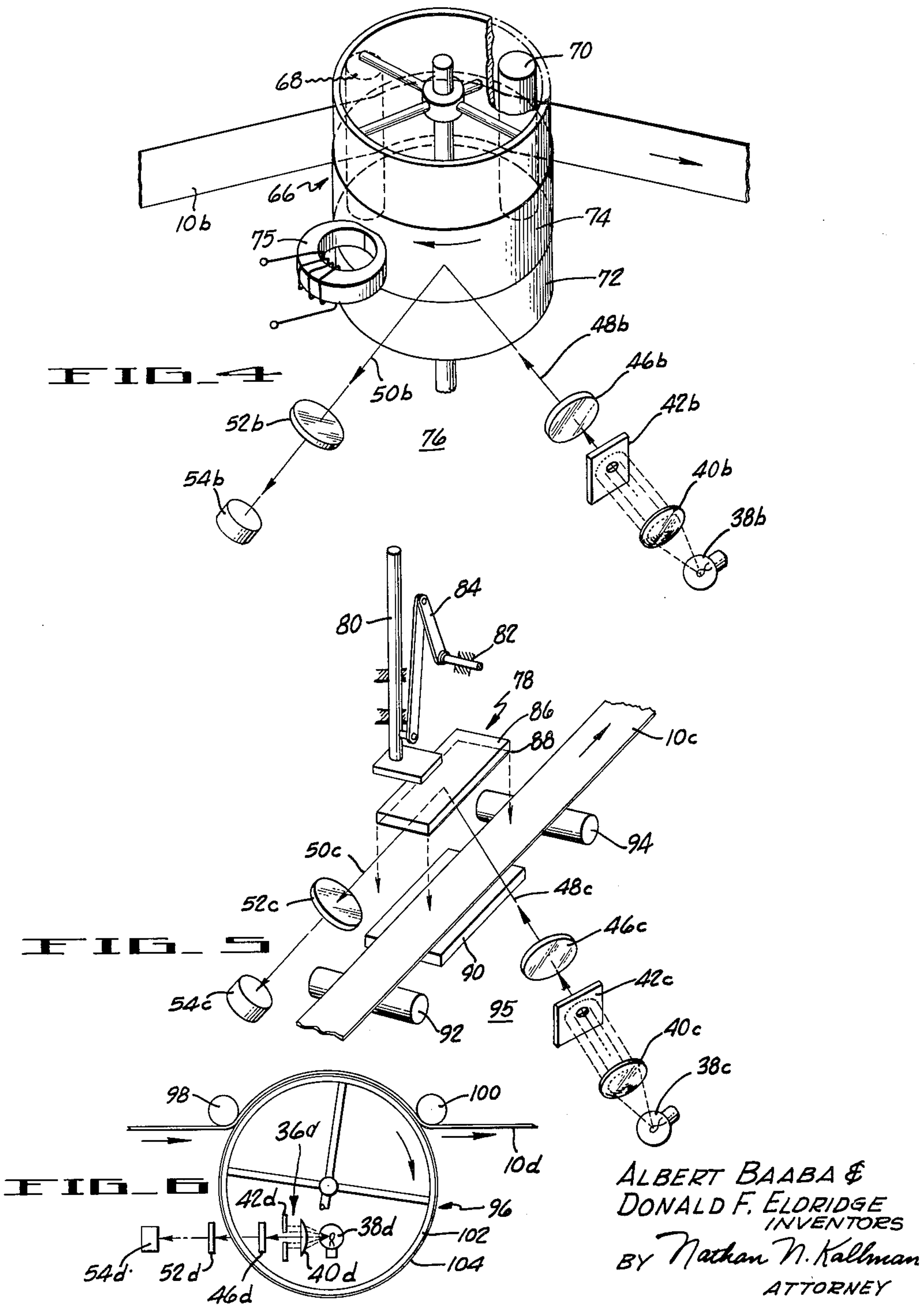
FIGURE 4 is a schematic perspective view of still another embodiment of a reproducing means in accordance with the present invention, which reproducing means includes a magneto-optic means for reading out the front surface of a magnetic film.
FIGURE 5 is a schematic perspective view of a further embodiment of a reproducing means in accordance with the present invention, which reproducing means includes a magneto-optic means for reading out the front surface of a magnetic film.
FIGURE 6 is a schematic plan view of still a further embodiment of a reproducing means in accordance with the present invention, which reproducing means includes a magneto-optic means for reading out the magnetic pattern on a magnetic film by passing a polarized light beam therethrough.

In the embodiment illustrated in FIGURE 4, wherein similar parts to those in FIGURE 1 are designated with the same reference numeral with the subscript "$b$," information recorded on the tape 10$b$ is reproduced by a reproducing means which includes a rotably mounted drum 66. The continuously moving tape 10$b$ is pressed against the drum 66 by a pair of spaced apart pressure or pinch rollers 68 and 70 of a suitable material such as rubber, synthetic rubber, etc. The tractive force of the moving tape 10$b$ on the rollers 68 and 70 rotates the same which, in turn, rotate the drum 66. Suitable means (not shown) is provided for moving the pinch rollers away from the drum 66 when the magnetic tape apparatus is in its rewind and fast forward modes of operation.

The drum 66 includes a highly polished cylindrical support member 72 and a relatively thin, circumferential film or band 74 of ferromagnetic material suitably deposited on the outer surface of the support member 72. The support member 72 is made of a material which provides a hard, smooth base for the band 74, such as glass, brass, etc. The band 74 is composed of a ferromagnetic material, such as cobalt, cobalt-nickel, iron, which preferably, for best reproduction, has a lower coercive force than the magnetic tape, but is sufficiently high to retain the impressed information after the tape field is no longer applied.

The magnetic pattern on the tape 10$b$ is transferred to the band 74 by the contact between the tape 10$b$ and the band 74. The transferred magnetic pattern on the highly polished outer or front surface of the band 74 is read out, after the band 74 and the tape 10$b$ separate, by a magneto-optic means 76 which may be similar to that described previously in connection with FIGURE 1. In the embodiment shown in FIGURE 4, the plane polarized light beam 48$b$ is directed at the band 74 at a point spaced clockwise of the area of contact between the tape 10$b$ and the drum 66.

After the information is read out the magnetization of the band 74 may be erased by an erase head 75 which is disposed in spaced relationship with the band 74 clockwise of the magneto-optic means 76. However, if the band 74 is composed of a material having a sufficiently low coercive force, the magnetization disappears once it comes under the influence of the fields from the tape, and hence the erase head 75 may not be required. This is true particularly for the case of NRZ digital recording.

In one embodiment of the drum type reproducing means shown in FIGURE 4, an optically polished glass drum 3 inches in diameter is employed. The drum is deposited with gold plating and a continuous circumferential band 400-A. thick of cobalt is electroplated on the gold plating.

In the embodiment illustrated in FIGURE 5, wherein similar parts to those shown in FIGURE 1 are designated with the same reference numeral with the subscript "$c$," the reproducing means includes a thin, flat rectangular plate 78 which is reciprocated between an extended position wherein the plate 78 is in contact with the tape 10$c$ and a retracted position wherein the plate 78 is spaced from the tape 10$c$. The illustrated plate 78 is guided in its movement by a rod 80 which is suitably connected thereto. The rod 80, which is supported for axial movement, is axially reciprocated by a motive means (not shown), such as a motor, the shaft 82 of which is connected to the rod 80 by a suitable linkage 84 for converting rotary motion into reciprocating motion.

The illustrated plate 78 includes a supporting member 86 and a relatively thin, highly polished film 88 of ferromagnetic material disposed on the surface of the member 86 which is faced toward the tape 10$c$. The supporting member 86 is made of a material which provides a hard, smooth base for the film, such as glass, brass, etc. The film 88 is composed of material which preferably, for best reproduction, has a lower coercive force than that of the magnetic tape, such as cobalt, cobalt-nickel, iron, etc.

The magnetic pattern on the tape 10$c$ is transferred to the film 88 by the contact between the tape 10$c$ and the film 88. To insure intimate contact between the film 88 and the tape 10$c$, a resilient backing member 90 is suitably supported at the opposite face of the tape 10$c$. The tape 10$c$ is guided in its movement by a pair of rollers 92 and 94, which rollers are disposed respectively before and after the backing member 90.

When the plate 78 is in its retracted position, the magnetic pattern thereon is read out by a magneto-optic means 95, which may be similar to that previously described in connection with the embodiment shown in FIGURE 1. The magnetic pattern on the film 88 may be erased by an erase head (not shown), after the pattern is read out and/or the coercive force of the film may be low enough so that the film is substantially demagnetized when it again contacts the tape.

In the embodiment illustrated in FIGURE 5, the plane polarized light beam 48$c$ is directed at the front surface of the film 88 when the plate 78 is in its retracted position. The plate 78 is reciprocated at a rate sufficient to enable the magnetic pattern on the tape to be read out without stopping the tape.

In one embodiment of the reciprocating type reproducing means, the glass supporting member is deposited with gold and a 1000-A. thick coating of cobalt is electroplated on the gold. The reproducing means is employed to read out digital information recorded on magnetic tape which is moved past the plate at a speed of 7.5 inches per second and the plate is reciprocated 15 times per second.

In the embodiment illustrated in FIGURE 6 wherein similar parts to those shown in FIGURE 1 are indicated with the same reference numeral with the subscript "$d$," the reproducing means includes a rotatably mounted drum 96, the moving magnetic tape 10$d$ being pressed against the drum 96 by a pair of spaced apart pressure or pinch rollers 98 and 100 of a suitable material such as rubber, synthetic rubber, etc. The drum 96 is thus rotated by the moving tape. The illustrated drum 96 includes a tubular support member 102 of transparent material, such as glass, quartz, etc. A very thin circumferential band or film 104 of ferromagnetic material, such as cobalt, cobalt-nickel, iron, etc., is deposited on the outer surface of the support member by employing, for example, vacuum evaporation techniques, etc. The film 104 is made sufficiently thin so that a polarized light beam may pass therethrough.

The magnetic pattern on the tape 10$d$ is transferred to the film 104 by the contact between the tape 10$d$ and the film 104. The transferred magnetic pattern on the thin film is read out, after the film 104 and tape 10$d$ separate, by a magneto-optic means which is arranged to pass a plane polarized light beam through the film. As illustrated in FIGURE 6, the magneto-optic readout means includes a means 35*d* for providing a plane polarized light beam which may be similar to that described previously in connection with FIGURE 1. The beam providing means is suitably supported within the tubular member 102 so that the light beam is directed at an angle to the plane of the film through the transparent supporting member 102 and through the film 104.

The plane of polarization of the light beam passing through the film 104 is rotated, the direction and amount of rotation being determined by the magnetic pattern registered on the film (magneto-optic Faraday effect). The rotation of the polarized light beam is detected by a detecting means which may be similar to that described above in connection with FIGURE 1.

In one embodiment of the film type reproducing means the support member is made of .25 inch thick glass and is approximately 3 inches in diameter. A 400-A. thick cobalt film is evaporated onto the outer surface of the supporting member.

As can be seen from the above, the present invention provides a means other than a conventional reproducing head for reproducing information from a magnetic tape. Thus the problems normally associated with reproducing heads, such as head wear, scraping of the tape, loss in output at low tape speeds, loss in output due to the magnetic gap effect, etc., are alleviated by the present invention. The reproducing means, in accordance with the present invention, reproduces information recorded on tape at a much higher rate and at a greater accuracy than the present reproducing heads.

It should be understood that magneto-optic read-out means other than that described above may be employed to read out the magnetic pattern on the film. For example, the film may be scanned in one or two directions by utilizing an image orthicon, iconoscope, vidicon tube, flying spot scanner, or photoelectric detection. Thus the film may be scanned longitudinally or transversely or at any desired angle to retrieve information. Therefore, the inventive system lends itself readily to various computer applications, coding systems, transverse recording systems, and image storage apparatus. Since the invention is not restricted to a fixed gap in association with a magnetic tape, various scanning arrangements may be utilized in accordance with desired objectives. Various other changes and modifications may be made in the above described reproducing means without departing from the spirit or scope of the present invention. For example, multiple reflection and various other techniques may be incorporated to enhance the results.

What is claimed is:

1. Apparatus for reproducing information represented as a magnetic pattern on a moving magnetic tape, comprising a supporting member, a thin film of ferromagnetic material on one surface of said member, said ferromagnetic material having a coercive force of substantially lower value than that of the ferromagnetic material of the magnetic tape, said film being disposed in magnetically coupled relation to the magnetic field established by the magnetic pattern on said tape to transfer the magnetic pattern to the film, a plane polarized light beam source disposed to direct a polarized light beam at the magnetic film so that the polarized light beam is affected by said film and particularly by the transferred magnetic pattern thereon, and means disposed in the path of the affected polarized light beam from said thin film for determining rotation of the same and thereby the amplitude and direction of magnetization of the recorded pattern on the magnetic tape.

2. Apparatus for reproducing information represented as a magnetic pattern on a moving magnetic tape, comprising a supporting member, a thin film of ferromagnetic material on one surface of said member, said ferromagnetic material having a coercive force of substantially lower value than that of the ferromagnetic material of the magnetic tape, said film being disposed in magnetically coupled relation to the magnetic field established by the magnetic pattern on said tape to transfer the magnetic pattern to the film, a plane polarized light beam source disposed to direct a polarized light beam at the magnetic film and at such an angle thereto that the polarized light beam is reflected by said film with the plane of polarization rotated through an angle commensurate with the transferred magnetic pattern on said film, and means disposed in the path of the reflected polarized light beam for determining rotation of the plane of polarization and thereby the amplitude and direction of magnetization of the recorded pattern on the magnetic tape.

3. Apparatus for reproducing information represented as a magnetic pattern on a magnetic medium, comprising a supporting member having a specular outer surface formed thereon, a thin film of ferromagnetic material disposed on the surface of said member, said ferromagnetic material having a coercive force of substantially lower value than that of the ferromagnetic material of the magnetic medium, means connected to said member for moving said member to a first position wherein said film and said medium are in magnetically coupled relation to transfer the magnetic pattern on the medium to the film and to a second position to separate said medium from said film, a plane polarized light beam source disposed to direct a polarized light beam at the outer surface of the film when said film is in its second position and at such an angle to said film that the polarized light beam is reflected by said film, and means disposed in the path of the reflected light beam for determining the rotation of the reflected light beam responsive to the transferred magnetic pattern on the film to determine the amplitude and direction of magnetization of the recorded pattern on the magnetic medium.

4. Apparatus for reproducing information represented by a magnetic pattern on a moving magnetic tape comprising a support member having a substantially planar surface, a thin film of ferromagnetic material on said surface, said ferromagnetic material having a substantially lower coercive force than that of the ferromagnetic material on said tape, means for supporting said member for movement between a first position wherein said film is pressed into magnetically coupled intimate contact with the tape to transfer said magnetic pattern from the tape to the film and a second position wherein said film is spaced from the tape, means for reciprocating said member to and from said first position and said second position, a plane polarized light beam source disposed to direct a polarized light beam at the film when said member is in its second position and at such an angle to said film that the polarized light beam is reflected by said film, and means disposed in the path of the reflected light beam for determining the rotation of the polarized light beam commensurate with the magnetic pattern on the film and thereby the amplitude and direction of magnetization in the recorded pattern on the magnetic tape.

5. Apparatus for reproducing information represented as a mangetic pattern on a magnetic tape, comprising a transparent supporting member having a smooth surface, a thin film of ferromagnetic material on said surface, said ferromagnetic material having a coercive force of substantially lower value than that of the ferromagnetic material of the magnetic tape, the thin film being disposed in magnetically coupled relation to the magnetic field established by the magnetic pattern on said tape to transfer the magnetic pattern from the tape to the film, a plane polarized light beam source disposed so as to direct a polarized light beam through said member toward the inner surface of said film and at such an angle thereto that the polarized light beam is reflected by said film, and means disposed in the path of the reflected polarized light beam for determining the rotation of the reflected light beam responsive to the transferred magnetic pattern on the film to determine the amplitude and direction of magnetization of the recorded pattern on the magnetic tape.

6. Apparatus for reproducing information represented as a magnetic pattern on a magnetic tape, comprising a supporting member having a highly polished surface, a thin film of ferromagnetic material on said surface, said ferromagnetic material of the thin film having a coercive force substantially lower than 250 oersteds, means for supporting the thin film in magnetically coupled relation to the magnetic field established by the magnetic pattern on said tape to transfer the magnetic pattern from the tape to the film, a plane polarized light beam source disposed to direct a polarized light beam at said member and said film at an angle thereto, said polarized light beam being responsive to the magnetic pattern on the film wherein the beam rotates through an angle commensurate with the magnetic pattern on the film, and means disposed in the path of the responsive polarized light beam for determining the rotation of the same and thereby the amplitude and direction of magnetization of the recorded pattern on the magnetic tape.

7. Apparatus for reproducing information represented as a magnetic pattern on a magnetic tape, comprising a rotatably mounted transparent tubular member, a very thin, circumferential band of ferromagnetic material on the outer surface of said member, said ferromagnetic material having a coercive force of substantially lower value than that of the ferromagnetic material of the tape, said film being disposed so that the tape is pressed into magnetically coupled intimate contact therewith to transfer to the film the magnetic pattern corresponding to that on the tape and whereby the member is rotated by the movement of said tape, a plane polarized light beam source disposed so as to direct a polarized light beam through the supporting member and the film at a point spaced from the area of contact between said tape and said film, the thickness of the film being such as to transmit said beam, and means disposed in the path of the transmitted light beam for determining the rotation of the polarized light beam as affected by the magnetic pattern on the film and thereby the amplitude and direction of magnetization in the recorded pattern on the magnetic tape.

8. Apparatus for reproducing information represented as a magnetic pattern on a movable magnetic tape, comprising a transparent rotatably mounted tubular member having a highly polished outer surface, a thin circumferential film of ferromagnetic material on said surface, said ferromagnetic material having a substantially lower coercive force than that of the ferromagnetic material of said tape, said film being disposed so that the tape is pressed into intimate contact therewith to transfer to the film the magnetic pattern corresponding to that on the tape and whereby the member is rotated by the movement of said tape, a plane polarized light beam source disposed so as to direct a polarized light beam through the member toward the surface of said film and at such an angle thereto that the polarized light beam is affected by the film and in particular the magnetic pattern thereon, and means disposed in the path of the affected light beam for determining the rotation of the same and thereby the amplitude and direction of magnetization in the recorded pattern on the magnetic tape.

9. Apparatus for reproducing information represented as a magnetic pattern on a magnetic tape, comprising a rotatably mounted cylindrical member having a highly polished outer surface, a thin circumferential band of ferromagnetic material on the outer surface of said member, said ferromagnetic material having a substantially lower coercive force than that of the ferromagnetic material of said tape, said film being disposed so that the tape is pressed into magnetically coupled intimate contact therewith to transfer to the film the magnetic pattern corresponding to that on the tape and whereby the member is rotated by the movement of said tape, a plane polarized light beam source disposed to direct a polarized light beam at the film at a point spaced from the area of contact between said tape and said film and at such an angle to said film that the polarized light beam is responsive to the magnetic pattern transferred to said film, and means disposed in the path of the responsive light beam for determining the rotation of the plane of polarization thereof and thereby the amplitude and direction of magnetization in the recorded pattern on the magnetic tape.

References Cited by the Examiner

UNITED STATES PATENTS

| | | | |
|---|---|---|---|
| 2,890,288 | 6/1959 | Newman | 179—100.2 |
| 2,984,825 | 5/1961 | Fuller et al. | 340—174.1 |
| 3,059,538 | 10/1962 | Sherwood et al. | 340—174.1 |
| 3,174,140 | 3/1965 | Hagopian | 340—174.1 |

OTHER REFERENCES

IBM Tech. Disclosure Bulletin, pages 67, 68, August 1960, by Hagopian et al.

IBM Technical Disclosure Bulletin, vol. 1, No. 5, pages 18, 19, February 1959, by D. M. Hart.

High Speed Magnetoptical Measurement on Films, Archibald et al., Review of Scientific Instruments, vol. 31, No. 6, pages 653–655, June 1960.

IRVING L. SRAGOW, *Primary Examiner.*

STEPHEN W. CAPELLI, *Examiner.*

K. E. JACOBS, F. C. WEISS, T. W. FEARS, *Assistant Examiners.*